United States Patent [19]

Laurent

[11] 4,346,189

[45] Aug. 24, 1982

[54] AGENT FOR FORMING CLEANER CUTTING PRESSURE SENSITIVE ADHESIVES

[75] Inventor: Jacques J. Laurent, Soignies, Belgium

[73] Assignee: Morgan Adhesives Company, Stow, Ohio

[21] Appl. No.: 168,507

[22] Filed: Jul. 14, 1980

[51] Int. Cl.³ .............................................. C08L 9/00
[52] U.S. Cl. ................................... 524/267; 524/269; 524/272; 525/105; 427/208.4; 428/355
[58] Field of Search ............... 525/105; 260/27 BB, 260/29.1 SB; 427/208.4; 428/355

[56] References Cited

U.S. PATENT DOCUMENTS 2,878,142  3/1959  Bohaty ........................... 260/27 BB
4,086,201  4/1978  Peters et al. ................. 260/29.1 SB
4,151,319  4/1979  Sackoff et al. ....................... 428/40

FOREIGN PATENT DOCUMENTS 887441  1/1962  United Kingdom ......... 260/29.1 SB

*Primary Examiner*—Wilbert J. Briggs, Sr.
*Attorney, Agent, or Firm*—Oldham, Oldham, Hudak & Weber Co.

[57] ABSTRACT

A pressure sensitive adhesive composition comprising the solids deposited from a mixture of solvents, synthetic rubber and tackifiers and also including a polysiloxane additive in about 6 to 10 percent of the resultant composition, which composition has reduced edge ooze or flow when on sheets subjected to a cutting action.

10 Claims, No Drawings

AGENT FOR FORMING CLEANER CUTTING PRESSURE SENSITIVE ADHESIVES

BACKGROUND OF THE INVENTION

One type of adhesive that has come into widespread commercial use in the past years is the pressure sensitive adhesive type and various kinds of pressure sensitive adhesives are available and are in widespread commercial use. These adhesives remain in a fluid state indefinitely and provide very effective adhesion for many different types of paper or film products including labels. This fluidity of "alive" condition of the adhesive is desired in order that the adhesive will flow and achieve a bond to any substrate brought into association therewith. Since these adhesives are of this liquid or flowable nature, they have a high tendency to ooze out at the edge of laminates or stacks of paper or other products with which they are associated. Particularly, a lot of these paper adhesive products are converted after their initial processing into laminates so as to provide a desired label or other end product. The converting operations usually involve cutting the initial paper-adhesive laminate sheet to reduce its size and thus the initial sheets are subjected to guillotine cutting and/or die cutting in most converting operations.

Inasmuch as it is very desirable to avoid any edge ooze of the adhesive during storage or converting of the products, some appreciable safeguards have been set up to be followed when processing the laminate. Thus, the cutting blades must be kept very sharp and usually a silicone coating is applied onto the cutting blade. Furthermore, adhesive bleed or ooze normally can be overcome by beveling the leading and trailing edges of the sheets at a 45° angle and then rubbing the edges with a cloth bag filled with powder, such as zinc stearate that fixes itself to any adhesive at the edge and renders it non-tacky. These converting cuts must normally be done at the lowest possible pressure and the maximum number of sheets that can be cut at one time usually is about 100. Hence, the converting and cutting of the pressure sensitive adhesive laminates is a difficult process and it is hard to maintain the end product in its most desirable, usable condition.

Obviously, if adjacent sheets are sticking together by adhesive at the edges of a plurality of stacked sheets, such adjacent sheets would move at the same time to the printing press and result in unusable products and scrap material.

The general object of the present invention is to reduce and/or avoid problems with edge ooze of pressure sensitive adhesives in making up various types of paper laminates and in enabling the laminates to be converted by guillotine type cutting actions and equivalents as they are being cut to size for the end product, and to provide such action without any edge ooze being obtained and with a minimum scrap being generated in the printing operation.

Another object of the present invention is to provide a new and improved type of pressure sensitive adhesive composition that is characterized by the absence of edge oozing or edge flow-out of the adhesive curing processing or converting of papers having these pressure sensitive adhesives thereon.

Another object of the invention is to use special polysiloxanes, i.e. silicone chemicals as additives to pressure sensitive adhesives which silicone appear to adsorb or graft onto other ingredients of the adhesives or take other unknown actions so as to reduce the tendency of the adhesive containing such silicone to have edge oozing of the adhesive during guillotine cutting and similar operations.

Another object of the invention is to provide an improved pressure sensitive adhesive using substantially conventional chemicals therein and to obtain the unexpected result of reducing the edge oozing of the adhesive by the presence of special silicone materials in the adhesive.

The foregoing and other objects of the invention will be made more apparent as the specification proceeds.

SUBJECT MATTER OF THE INVENTION

A pressure sensitive adhesive composition comprising the solids deposited from a mixture of solvents, synthetic rubber and tackifiers and also including a silicone additive in about 6 to 10 percent of the resultant composition.

I have found that I can obtain an unusual, unexpected result by adding some silicone materials to pressure sensitive adhesive compositions. Heretofore, silicone chemicals, because of their low surface tensions, have been known and used for many years as being very good release agents as for coating on backing papers of pressure sensitive adhesive laminate materials. These silicones normally are considered as being incompatible with the adhesives. I have found, however, that reactive and non-reactive silicone chemicals can be added even at relatively high concentrations to pressure sensitive adhesive compositions directly and that they will not adversely affect the adhesive characteristics of the material. However, even by adding these silicones directly to the adhesive, the pressure sensitive adhesive characteristics are not adversely affected but the convertibility of manufactured products using these adhesives has been improved. For example, by use of the adhesive composition of the invention, the edge oozing characteristics as occurring at guillotine cutting or drill punch pressing or cutting of the laminates has been drastically reduced or suppressed. Nor does the punching through operation of the sheets carrying pressure sensitive adhesive materials result in any clogging of the punching device.

The present inventive concept has been particularly developed for and is applicable to the solvent based pressure sensitive adhesives. However, it is believed that the addition of the silicone chemicals to hot melt, water based, and U.V. cured pressure sensitive adhesives is also possible.

A typical composition of the invention would be as follows:

| INGREDIENTS | PARTS |
| --- | --- |
| Hexane | 56.51 |
| Toluene | 14.37 |
| SBR Rubber | 9.96 |
| IR Rubber | 1.74 |
| Tackifier 1 | 11.70 |
| Tackifier 2 | 2.31 |
| Processing Aid Oil | .84 |
| Antioxidant | .50 |
| Polysiloxane Additive | 2.17 |
| | 100.00 |

-continued

| INGREDIENTS | PARTS |
|---|---|
| Total Solids | = 29.22% |

$$\text{Ratio} \frac{\text{Silicone Additive}}{\text{Other Solid Ingredients}} = \frac{2.17}{27.05} = 0.080$$

In the above formulation, Tackifier 1 comprises Staybelite Ester #10 which is a glycerol ester of rosin and Tackifier 2 comprises Cellolyn 21, which is a phthalate ester of technical hydroabietyl alcohol. Both of these tackifiers are products of Hercules, Inc.

The processing aid oil used was Circolight Oil made by the Sun Oil Company. The antioxidant was 2.2' isobutylidene bis (4.6 dimethyl-phenol) product which is manufactured by Bayer under the tradename VULKANOX NKF. Any hindered phenolic antioxidant known as being non-staining and non-volatile could be used.

The particular polysiloxane additive was of the following formulation:

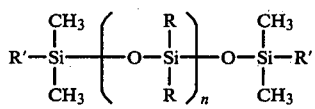

In the above formulation, R is either a methyl, a phenyl, a vinyl or a silicon bonded hydrogen group.

The R' is either a methyl or a hydroxyl chemical group.

This polysiloxane additive could therefore be grafted to the ingredients of the adhesive by chemically active groups. Particularly, this chemically active site may comprise the following:

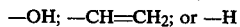

In this silicone additive in the above formulation, the silicone usually contains about 8 percent of the solids material in the composition and this solid composition could vary from a minimum of about 6 percent solids in the adhesive up to a maximum amount of about 10 percent of the solids.

In mixing the composition of the invention, no special precautions or actions are required and the adhesive formulation can be prepared in a conventional manner. Normally, polysiloxane additive is just mixed in with the other ingredients when dissolving the rubbers and other materials into the solvents used.

The actual polysiloxane additive used in the foregoing example had methyl groups at both R and R' positions.

Such chemicals are known as silicone fluids or silicone oils.

Being non-reactive these silicone oils must be non-volatile in order to avoid striking through absorbent facing materials.

The dimethyl silicone oil must therefore have a viscosity higher than 20 centistokes at 77° F. (25° C.).

For most of our experiments a silicone oil of 350 centistokes at 77° F. was preferred and such oil was used in the foregoing specific example.

This oil used in the example has a weight average molecular weight ranging from approximately 10,000 to 11,000 from random polymerization and therefore contains from about 135 to about 150 dimethylsiloxane units as represented by n.

The minimum value for n in the foregoing formula is 16 which roughly corresponds to 20 centistokes, whereas the maximum value is about 150.

The silicone additive is present in the original composition in slightly above 2 parts out of 100 in its average of its range of 6 to 10 percent of the end composition.

While not impairing the action of the pressure sensitive adhesive, the additive reduced edge ooze or flow of the adhesive when on sheets subjected to a cutting or shearing action.

Volatile polysiloxanes must, of course, be grafted, i.e. must comprise chemical active sites in order to avoid any migration or striking through absorbent facing materials.

In the specification and claims, solid material means non-volatile materials.

The adhesive composition of the invention provides improved operating, and use characteristics including reduced edge ooze. Hence the objects of the invention are achieved.

While one complete embodiment of the invention has been disclosed herein, it will be appreciated that modification of this particular embodiment of the invention may be resorted to without departing from the scope of the invention.

What is claimed is:

1. A pressure sensitive adhesive composition comprising the solids deposited from a mixture of synthetic rubber, and tackifiers and also including a silicone additive in the amounts of from about 6 to 10 percent of the resultant composition and where the silicone is a polysiloxane that has the formula of;

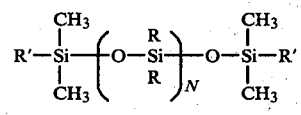

and where R is either a methyl, a phenyl, a vinyl or a silicon bounded hydrogen group and R' is selected from the group consisting of either a methyl, or a hydroxyl group, and N is from 16 to 150, and the viscosity of said polysiloxane is from about 20 to about 350 centistokes.

2. A pressure sensitive adhesive composition comprising the solids deposited from a mixture principally formed of synthetic rubber, and tackifiers but also including and being characterized by a polysiloxane additive in the amounts of from about 6 to 10 percent of the resultant composition, the polysiloxane being a dimethyl silicone oil having a viscosity from about 20 to about 350 centistokes at 77° F. (25° C.).

3. A pressure sensitive adhesive as in claim 1 where n varies from 135 to 150.

4. A pressure sensitive adhesive as in claim 2, where the dimethyl silicone oil has a viscosity of about 350 at 25° C.

5. A pressure sensitive adhesive composition as in claim 4, where the polysiloxane is a dimethyl silicone oil with the formula of:

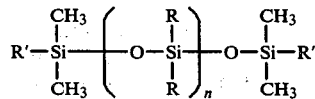

and where R is a methyl, group and R' is selected from the group consisting of either a methyl, or a hydroxyl group, and n is between 135 and 150.

6. A pressure sensitive adhesive as in claim 3, wherein said R' is methyl and wherein said R is methyl.

7. A pressure sensitive adhesive composition as in claim 6, wherein said viscosity is about 350 centistokes.

8. A pressure sensitive adhesive composition as in claim 7, wherein said polysiloxane is a dimethyl silicone oil.

9. A pressure sensitive adhesive composition as in claims 1, 3, 6, 7 or 8, wherein said polysiloxane has a weight average molecular weight of from about 10,000 to about 11,000.

10. A pressure sensitive adhesive composition as in claim 2, 4 or 5, where said polysiloxane has a weight average molecular weight of from about 10,000 to about 11,000.

* * * * *